United States Patent [19]
Hine

[11] 3,822,755
[45] July 9, 1974

[54] KIT FOR CONVERTING CONVENTIONAL MOTORCYCLE INTO SNOWMOBILE
[75] Inventor: Derek L. Hine, Palo Alto, Calif.
[73] Assignee: Advanced Recreation Equipment Corporation, Mountain View, Calif.
[22] Filed: July 21, 1972
[21] Appl. No.: 273,972

[52] U.S. Cl............................. 180/5 R, 180/9.24 A
[51] Int. Cl............................................. B62m 27/02
[58] Field of Search.......... 180/5 R, 9.24 A, 9.24 R, 180/9.5

[56] References Cited
UNITED STATES PATENTS

| | | | |
|---|---|---|---|
| 2,284,075 | 5/1942 | Tucker.............................. | 180/5 R |
| 2,475,250 | 7/1949 | Peterson........................ | 180/9.24 R |
| 2,819,093 | 1/1958 | Geiser............................. | 280/112 A |
| 3,077,238 | 2/1963 | Nelson....................... | 180/9.24 R X |
| 3,140,752 | 7/1964 | Feu..................................... | 180/5 R |
| 3,318,403 | 5/1967 | Hansen....................... | 180/9.24 R X |
| 3,412,821 | 11/1968 | Humphrey................. | 180/9.24 R X |
| 3,583,507 | 6/1971 | Trautwein.......................... | 180/5 R |
| 3,707,199 | 12/1972 | Gerich............................... | 180/5 R |

FOREIGN PATENTS OR APPLICATIONS
245,866   8/1947   Switzerland....................... 180/9.24

*Primary Examiner*—Richard J. Johnson
*Attorney, Agent, or Firm*—John J. Leavitt

[57] ABSTRACT

Presented is a kit for attachment to the frame and power unit of a conventional motorcycle from which the front and rear wheels have been removed to convert the conventional motorcycle into a snowmobile.

16 Claims, 17 Drawing Figures

PATENTED JUL 9 1974 3,822,755
SHEET 1 OF 4
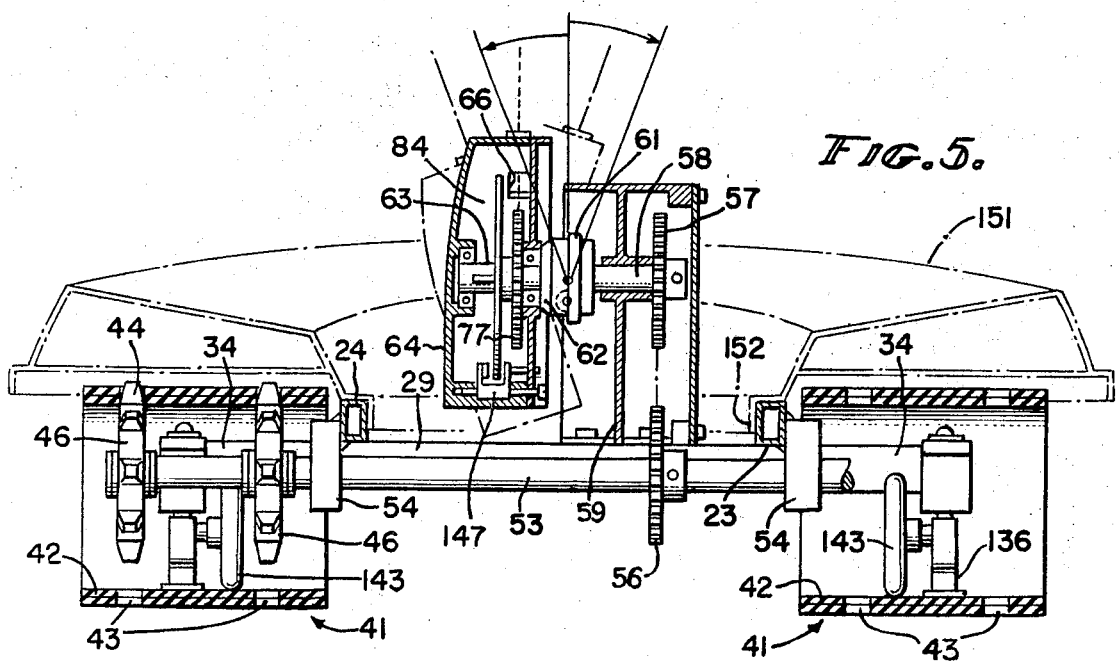

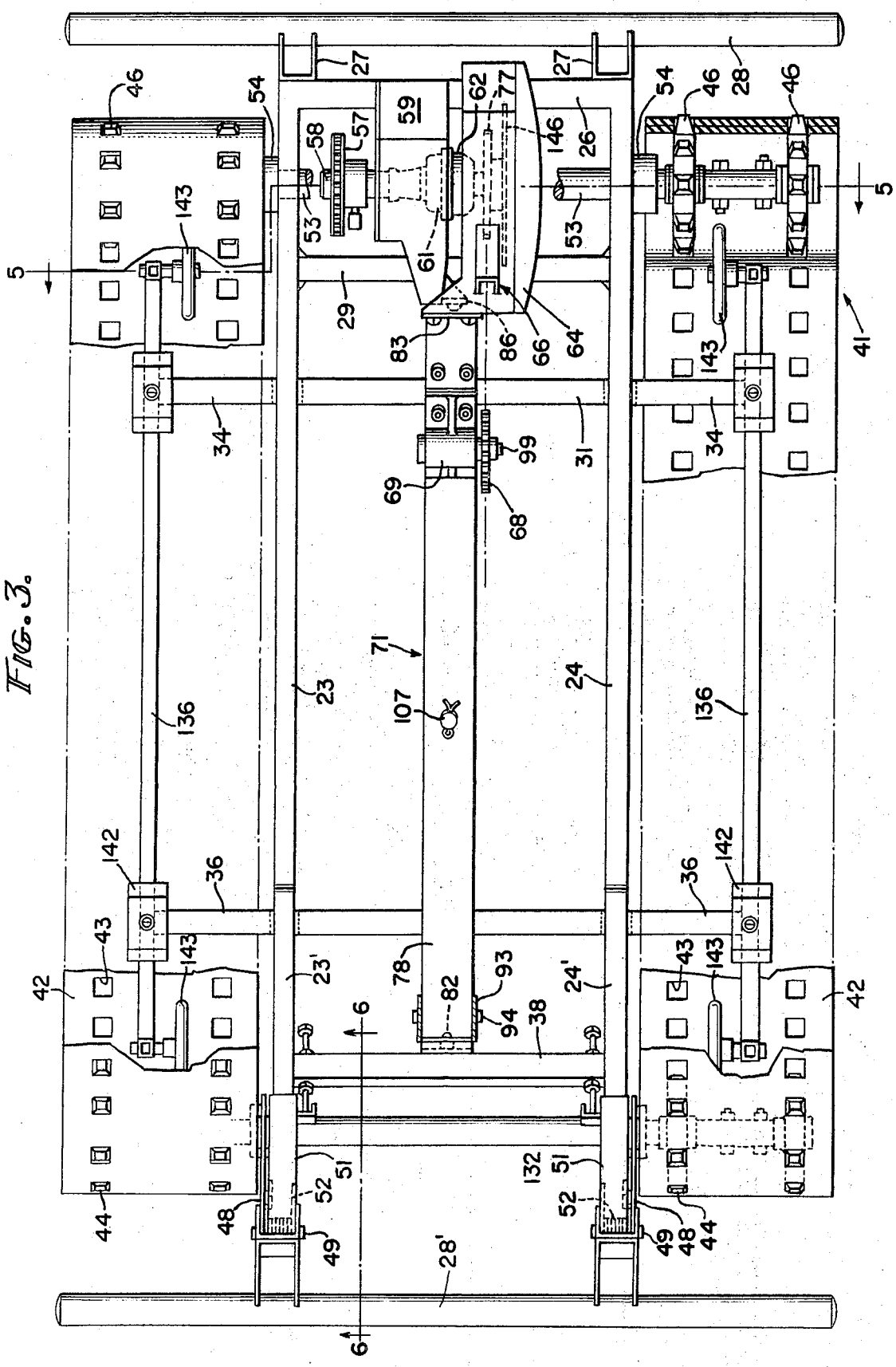

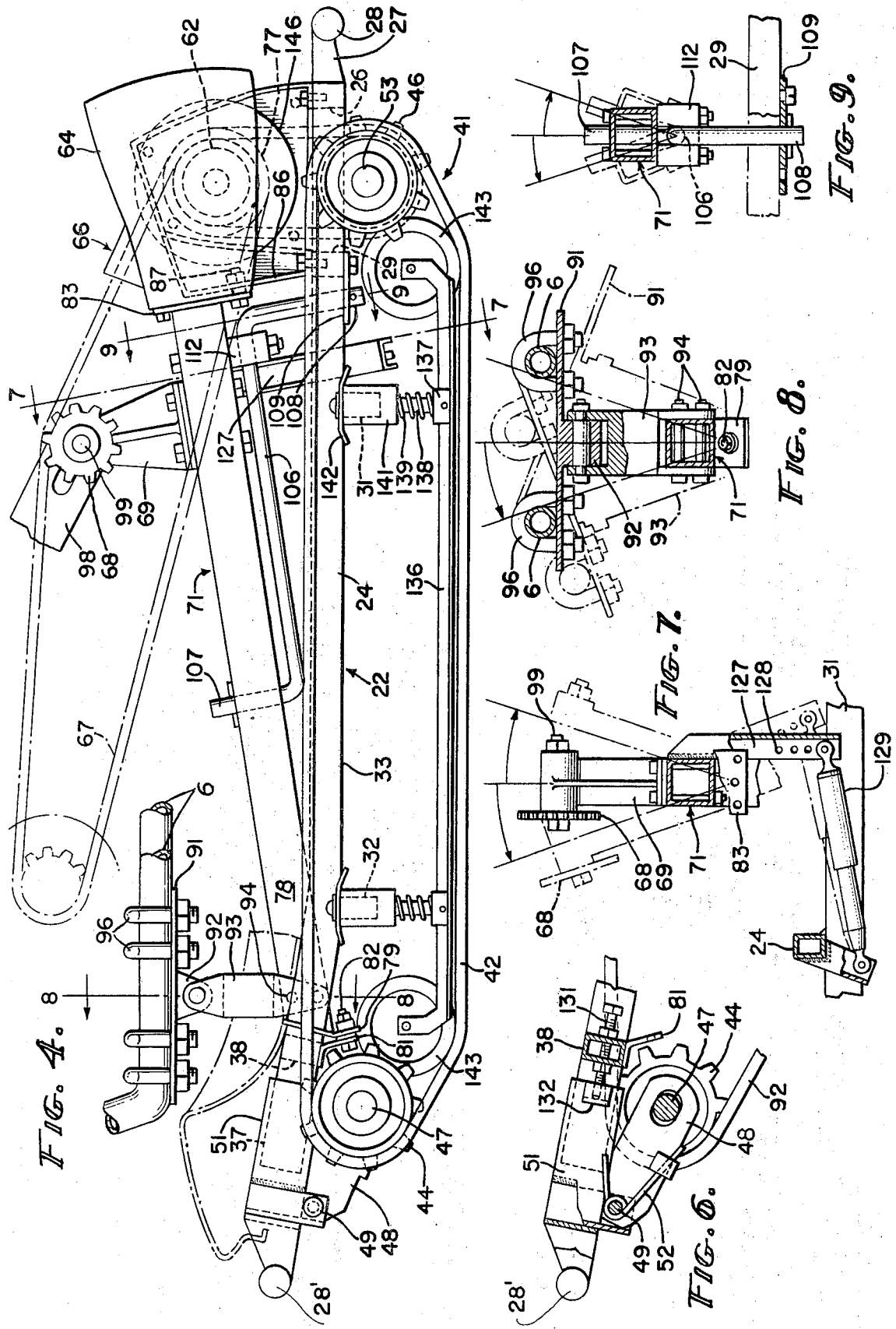

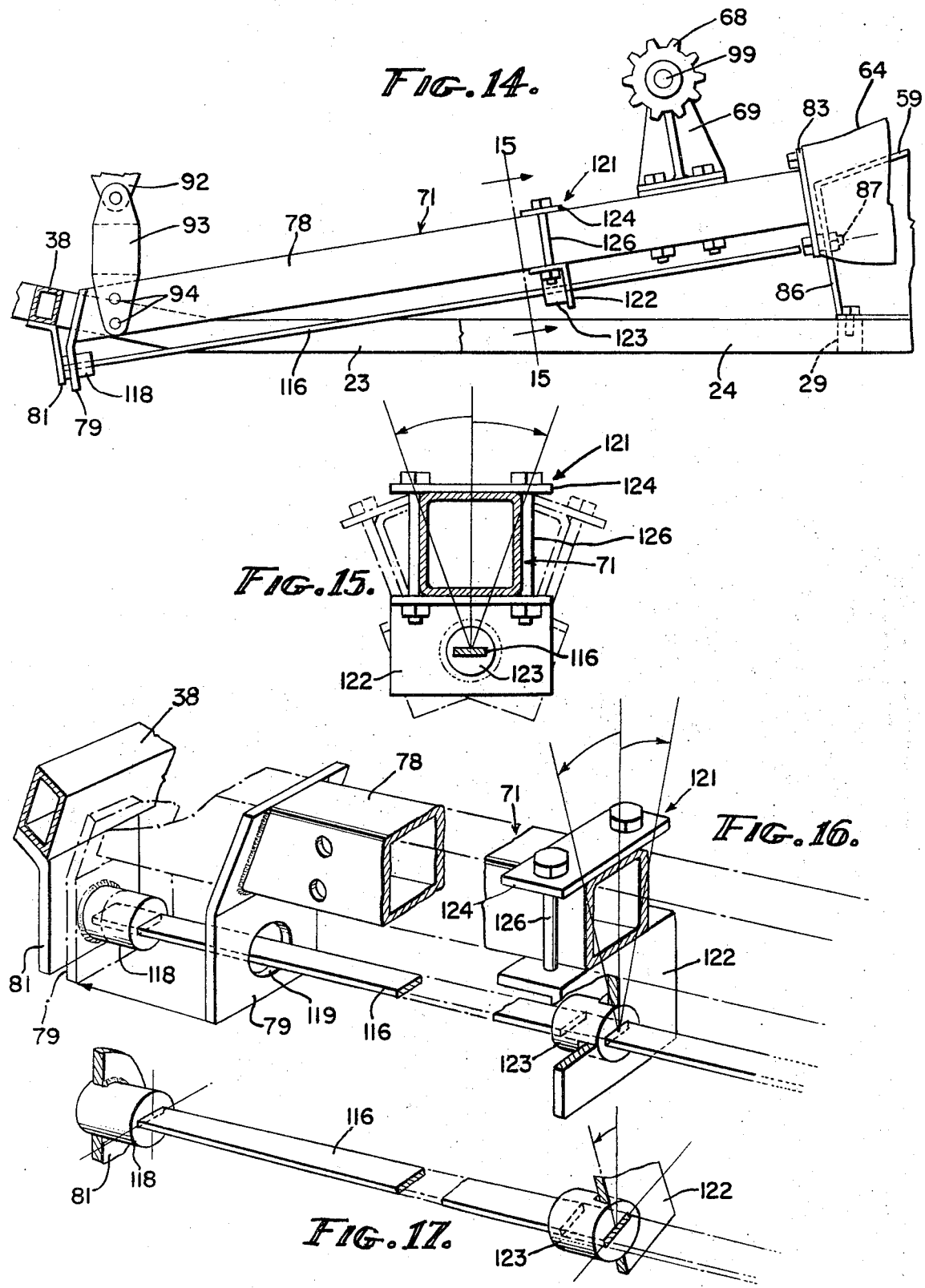

3,822,755

KIT FOR CONVERTING CONVENTIONAL MOTORCYCLE INTO SNOWMOBILE

BACKGROUND OF THE INVENTION

In recent years the interest of the public in motorcycles and in snowmobiles has increased greatly. Motorcycles are now manufactured and sold for specific purposes, i.e., for operation in the dirt, for racing, and for touring. There appears to be, seemingly, a motorcycle for every age. It is not unusual to find families in which each of the members owns a motorcycle. In the same way, the snowmobile is a relatively recent innovation that captures the enthusiasm of more and more people each year. One of the disadvantages of ownership of a motorcycle or a snowmobile is that the use of each of these vehicles tends to be seasonal, or at least restricted, in that motorcycles cannot ordinarily be operated in the snow, while snowmobiles ordinarily are not operated where there is no snow. Accordingly, it is one of the principal objects of the present invention to provide a conversion kit which may be applied to a conventional motorcycle frame and power unit to convert the motorcycle into a snowmobile for use in snow.

Conversion kits for motorcycles for use as snowmobiles are known in the prior art. However, conversion kits for this purpose usually involve attachment of a track unit and skid to the complete motorcycle, including one or both of the wheels, resulting in an impractical structure largely useless for use on land, and generally ineffective when used in a snow environment. Such structures are taught by U.S. Pat. Nos. 3,545,559; 3,596,727; 3,318,403; 3,336,994 and 3,412,821. Accordingly, it is another object of the present invention to provide a conversion kit for a conventional motorcycle, which, when attached to the conventional motorcycle frame and motor, provides a snowmobile designed to be efficient, safe and easily controlled in a snow environment.

One of the problems that has heretofore prevented the practical combination of a conversion kit with a conventional motorcycle has been the inability to attach these two components in such manner that steering of the snowmobile could be easily achieved. The steering function of a snowmobile includes two important parameters. These parameters include, firstly, the steering axis and the point of interception thereof by the surface of the snow on which the snowmobile is operating, and secondly, the lean axis of the motor frame in relation to the track assembly that propels the snowmobile over the snow. Accordingly, it is a still further object of the invention to provide a conversion kit to convert a conventional motorcycle into a snowmobile in which the steering axis of the snowmobile and lean axis of the motor frame are cooperatively correlated one to the other to provide maximum stability and steerability of the snowmobile.

Still another problem that has been encountered by those who have attempted to convert the conventional motorcycle into a snowmobile has been the problem of providing an adequate drive mechanism between the conventional power plant of the motorcycle and the track assembly adapted to drive the snowmobile. In general, prior art conversion kits do not provide for tilting or leaning of the motor frame in relation to the track assembly, essential to accommodate rough terrain and running of the snowmobile on slopes. Accordingly, it is a still further object of the present invention to provide in combination, a conventional motorcycle frame and power plant and a track assembly suitably attached thereto to permit limited relative movement in a fore and aft direction between the motor frame and the track assembly, and permit controlled pivotal movement of the motor frame about a longitudinal lean axis in relation to the track assembly to permit leaning of the motor frame to stabilize operation thereof even on steep slopes while permitting full power operation in all attitudes of the motor frame.

The invention possesses other objects and features of advantage, some of which, with the foregoing, will be apparent from the following description and the drawings. It is to be understood however that the invention is not limited to the embodiment illustrated and described, since it may be embodied in various forms within the scope of the appended claims.

SUMMARY OF THE INVENTION

In terms of broad inclusion, the invention comprises a conversion kit attachable to a conventional motorcycle frame and power plant, and the combination which results therefrom. The conversion kit includes a drive track assembly and steering ski unit attachable to the conventional frame and forks of a motorcycle from which the wheels have been removed. The drive track assembly includes a rigid tubular steel frame on which are suitably journaled two sets of drive track sprockets adapted to engage a pair of continuous twin tracks.

A drive mechanism is secured to the track frame and operatively engages one set of sprockets with primary source of power to effectively drive the endless tracks over the surface of the snow. A bike frame mounting beam is mounted on the track frame for controlled pivotal movement about a generally longitudinally extending "lean" axis inclined to intercept the surface of the snow ahead of the track assembly. Torsion bar means are provided associated with the mounting beam to resiliently control leaning movement of the motor frame in relation to the track frame. Means are also provided in one aspect of the torsion bar means to adjust the effective length of the torsion bar to increase or decrease the force required to be applied to lean the motor frame in relation to the track assembly. Increased stability and maneuverability of the snowmobile is provided by arranging the ski unit in relation to the fork structure so that the steering axis intersects the lean axis at the surface of the snow on which the snowmobile is to operate.

BRIEF DESCRIPTION OF THE DRAWINGS

FIG. 1 is a perspective view illustrating the completed snowmobile in an attitude of operation.

FIG. 2 is a side elevational view illustrating the major components of the snowmobile after conversion.

FIG. 3 is a plan view of the drive track assembly portion of the conversion kit shown apart from the motorcycle frame. Portions of the structure are broken away to disclose underlying parts.

FIG. 4 is a side elevational view of the track assembly portion of the conversion kit, illustrating its manner of attachment to the motorcycle frame and power unit.

FIG. 5 is a vertical cross-sectional view taken in the plane indicated by the line 5—5 in FIG. 3, and illustrating the drive mechanism and brake assembly.

FIG. 6 is a fragmentary vertical cross-sectional view taken in the plane indicated by the line 6—6 in FIG. 3, and illustrating the resilient mounting for the front set of track sprockets and the track take-up means.

FIG. 7 is a vertical cross-sectional view taken in the plane indicated by the line 7—7 in FIG. 4, and illustrating the manner in which the bike frame mounting beam may be tilted to effect leaning of the bike frame in relation to the track assembly.

FIG. 8 is a fragmentary cross-sectional view taken in the plane indicated by the line 8—8 in FIG. 4, and illustrating the method of attachment of the forward end of the bike mounting beam to the front end of the motorbike frame, and showing in dash lines the degree of tilt permitted of the mounting beam in relation to the track frame.

FIG. 9 is a fragmentary vertical cross-sectional view taken in the plane indicated by the line 9—9 in FIG. 4, and showing one embodiment of the torsion bar interposed between the mounting beam and track frame. Alternate positions of one crank arm of the torsion bar are shown in broken lines.

FIG. 10 is a plan view of the steering ski portion of the conversion kit shown apart from the motorcycle fork assembly on which it is adapted to be attached.

FIG. 11 is a bottom plan view of the steering ski portion of the conversion kit.

FIG. 12 is a vertical cross-sectional view taken through the steering ski in the plane indicated by the line 12—12 in FIG. 10.

FIG. 13 is generally horizontal cross-sectional view taken in the plane indicated by the line 13—13 in FIG. 2, and illustrating the brackets for attachment of the ski to the fork assembly of the motorcycle.

FIG. 14 is a fragmentary elevational view illustrating a portion of the track frame and mounting beam secured thereto, and incorporating a torsion bar of different design from that illustrated in FIG. 4.

FIG. 15 is a vertical cross-sectional view taken in the plane indicated by the line 15—15 in FIG. 14 and illustrating the method of attachment of the torsion bar of this embodiment along the "lean" or pivotal axis of the bike mounting beam.

FIG. 16 is a fragmentary view in perspective illustrating the method of attachment of one end of the torsion bar to the track frame, and an intermediate portion thereof to the mounting beam.

FIG. 17 is a fragmentary perspective view illustrating the flat torsion bar "twisted" about the lean axis to control pivotal movement of the mounting beam and motorcycle frame in relation to the track frame.

DESCRIPTION OF THE PREFERRED EMBODIMENT

In terms of greater detail, the conversion kit of the invention, and the novel combination that results from application of the conversion kit to a conventional motorcycle frame and power plant, is illustrated in FIG. 1 in an attitude of use, and is illustrated in FIG. 2 in side elevation. Referring to FIG. 2, it will there be seen that in one aspect the invention includes the combination of a conventional motorcycle frame designated generally by the numeral 2, a drive track assembly designated generally by the numeral 3 and quickly and easily attachable and detachable to the motorcycle frame, and a steering ski assembly designated generally by the numeral 4.

The motorcycle frame is in all respects conventional, including a lower frame portion 6 on which is supported an engine 7 having a drive sprocket 8 which, in a conventional motorcycle, cooperates with a chain to drive an appropriate sprocket mounted on a rear axle of the motorcycle in association with the rear wheel. In the present invention, the conventional chain is eliminated and there is substituted therefor a substantially longer chain 9 appropriately connected to driving means mounted on the drive track assembly 3 in a manner which will hereinafter be explained in greater detail. The upper portion of the motorcycle frame includes generally horizontal members 13 on which is appropriately supported a gas tank 14 and a seat structure 16.

The upper frame members 13 and lower frame members 6 are connected by upwardly projecting frame members 17 which converge toward a turning or steering head 18 which permits pivotal movement of the handlebar assembly 19 about a steering axis 20 in relation to the motorcycle frame. Conventional handlebars 21 are provided to steer the vehicle during use.

In the interest of brevity, the structural and functional aspects of the drive track assembly 3 will be described in detail, and then the interconnection of the drive track assembly to the motorcycle frame, and the attachment of the steering ski assembly to the fork structure of the motorcycle frame will be described. Referring to FIGS. 3 and 4, it will there be seen that the drive track assembly comprises a track frame designated generally by the numeral 22, including longitudinal side rails or stringers 23 and 24, equally spaced on opposite sides of a longitudinally extending and medianly positioned axis, and extending parallel to one another and to such longitudinal axis.

The stringers are preferably tubular steel members which provide rigidity in both vertical and horizontal planes. The ends of the stringers viewed on the right in FIG. 3 are integrally connected by a transversely extending end rail 26 conveniently welded perpendicularly between the stringers to tie them together, and utilized also to support brackets 27 to which is welded a transversely extending bumper 28 conveniently in the form of a rigid pipe. The bumper functions as a handle for lifting and carrying the conversion kit, with or without the motor bike attached. Spaced to the left of the end rail 26 and parallel with it, is a cross-beam 29 welded at opposite ends to the stringers. This beam functions to lend rigidity to the assembly, and cooperates with end rail 26 to provide a platform to support a drive mechanism as will hereinafter be explained in greater detail.

Additional cross-beams 31 and 32 are spaced along the stringers in general parallelism to each other and to the end rail 26 and cross-beam 29, and are welded to the lower surface 33 of the stringers. End portions 34 and 36 on these cross-beams extend outwardly beyond the stringers as shown. Crossbeams 31 and 32 thus provide added rigidity to the drive track frame, and function also to support an auxiliary carriage assembly and track guide means as will hereinafter be explained. Forwardly of the cross-beam 32, the stringers are bent upwardly in portions 23' and 24', these portions being inclined upwardly with respect to the remainder of the stringers. Adjacent the free ends 37 of the upwardly inclined stringer portions 23' and 24', there is provided still another cross-beam 38, welded as the others to the stringers. It will thus be seen that for the entire length of the track frame, the numerous transversely extending cross-beams cooperate with the stringers to produce a very rigid structure resistant to bending or twisting. Preferably, the stringers and beams described above all possess a box section for maximum rigidity in both vertical and horizontal planes.

To lend mobility to the frame, endless track means designated generally by the numeral 41 are provided, and include a twin pair of parallel running endless belts 42, each formed along its entire length with two rows of apertures 42 adapted to receive the cogs 44 of sprockets 46. In the alternative wheels having apertures and belts having cogs may be used. In addition, and for purposes of clarity not illustrated, the belts are provided on their snow-engaging surface with appropriate cleats or tread design to provide traction in the snow. At the front end of the track assembly, viewed at the left in FIG. 3, the sprockets 46 are arranged in a set of two pairs of sprockets, one pair mounted as shown on opposite sides of the frame. The specing between the sprockets coincide with the spacing between the rows of apertures 43 in the endless belt. The sprocket pair on each side of the frame is keyed for rotation with a transversely extending shaft 47, journaled at the front end of the frame as viewed in FIG. 3 on a pair of pivoted bearing plates 48, each bearing plate being pivotally mounted by pin 49 on a sleeve 51 adapted to slip over the extreme end 37 of the associated upperwardly inclined rail portion 23' or 24'. As viewed in FIG. 6, the bearing plates 48 are resiliently biased in a clockwise direction about the pivot pin 49 by an appropriate spring 52. It will thus be seen that the front end sprocket assembly is resiliently mounted, the biasing force of the resilient mounting being selected to adequately support the weight of the front end of the assembly and resiliently absorb major shocks that the assembly may encounter during use of the machine. Bumper 28' is appropriately welded to the ends of sleeves 51 as shown.

At the opposite end of the track frame a similar set of drive sprockets 46' are mounted one pair on opposite sides of the track frame for selective rotation to drive the endless tracks over the surface of the snow. Together with the shaft 47 and associated pairs of sprockets on the front end of the track frame, the pairs of sprockets associated with the rear end of the frame (to the right in FIG. 3) constitute the running gear for the track assembly. In this instance, the pairs of drive sprockets 46' are suitably fixed for rotation with a shaft 53 journaled on stringers 23 and 24 by bearing blocks 54. To rotate the shaft 53 and thereby cause rotation of the drive sprockets 46' mounted thereon, and consequent rotation of the twin tracks 42, there is provided on the shaft 53 a keyed drive sprocket 56 as shown in FIG. 5.

Rotation of the drive sprocket is accomplished through rotation of an aligned intermediate or auxiliary drive sprocket 57 keyed on the end of an auxiliary drive shaft 58 journaled in a bearing bracket 59 superimposed over and rigidly secured to end rail 26 and cross-beam 29 as shown in FIGS. 3, 4 and 5. At its end opposite drive sprocket 57 the auxiliary drive shaft 58 is provided with one half 61 of a constant velocity universal joint, the other half 62 of which is mounted on the end of a stub shaft 63 journaled in a drive housing 64 which is itself pivotally mounted on the track frame in a manner which will hereinafter be explained. The drive housing is provided with an aperture 66 through which passes one reach of a drive chain 67. The drive chain interengages main drive sprocket 8 found on the motor 7, idler sprocket 68 journaled on bracket 69 fixed on a pivotally supported bike mounting beam 71, and drive sprocket 72 mounted on stub shaft 63 and contained within the drive housing 64. There is thus provided a continuous power train between the main power sprocket 8 on the motor and the set of drive sprockets 46' which engage and drive the twin tracks. The constant velocity universal joint forming a part of this power train permits disalignment of the stub shaft 63 in relation to the auxiliary drive shaft 58, to accommodate leaning of the motor frame in relation to the auxiliary driveshaft without loss of efficiency in the drive train, when the bike mounting beam 71 pivots about the "lean" axis defined by extension of the pivotal axis.

The axis of the mounting beam 71 is in planar alignment with a longitudinal axis extending medianly lengthwise of the track frame. At its forward end 78 the mounting beam is provided with a downwardly projecting bearing lug 79 which cooperates with an associated bearing plate 81 fixed on the cross-beam 38 and suitable pivot pin 82 to pivotally support the forward end of the bike mounting beam 71 on the cross-beam 38. At its opposite or aft end, the mounting beam 71 is provided with a flange 83 appropriately bolted to the forward wall 84 of the drive housing 64, the drive housing in turn being pivotally mounted, together with the aft end of the mounting beam, on the forward wall 86 of the bearing bracket 59 by an appropriate pivot pin 87. As illustrated in FIGS. 2 and 4, the extended axes of pivot pins 82 and 87 are axially aligned and define a "lean" axis 88 inclined to the horizontal which when extended forwardly intersects the steering axis 20 at a point lying generally at the surface of the snow when the snowmobile lies quiescent thereon and supports the weight of one rider. Because of the action of the conventional shock absorbers and springs incorporated into the fork assembly during use, this point of intersection of the lean axis 88 with the steering axis 20 will vary a small amount forwardly and rearwardly from this point, but in general will be located as shown substantially at the surface of the snow on which the snowmobile is being operated. It has been found that this relationship of the steering axis to the lean axis provides optimum maneuverability and stability of the snowmobile.

To mount the motorcycle frame on the drive track assembly, the front and rear wheels of the motorcycle are removed, as is the drive chain for the motorcycle. Thereafter, the lower frame portion 6 of the motorcycle is provided with an adaptor assembly including an anchor plate 91 on which is formed a depending lug 92 to which is pivoted a mounting link 93. The lower end of the mounting link is pivoted to an appropriate pivot pin 94 extending transversely through the mounting beam 71 closely adjacent the forward end 78 thereof. The link permits limited fore and aft motion of the bike frame relative to the mounting beam to accommodate drive chain adjustment and rear suspension movement. The anchor plate is fastened to the frame members 6 by suitable U-bolts 96 or by using the existing engine motor mount bolts. The rear end of the motorcycle frame is conventionally provided with a pair of laterally spaced rearwardly extending struts 97 having bifurcated ends 98 adapted to receive the rear axle associated with a conventional motorcycle wheel. In the instant case, upon conversion, the bifurcated ends 98 of the struts are slipped into engagement with a transversely extending idler shaft 99 on which is journaled the idler sprocket 68. The idler shaft is suitably journaled on the transversely extending bracket 69, shown mounted on the bike mounting beam in FIG. 4. For additional stability, and to absorb shocks that might be imposed on the track assembly, the existing suspension of the bike is used, including shock absorbing strut 101 disposed between the idler shaft 99 and the under side of the upper frame portion 13, the strut preferably being of the telescoping type provided with a stiff coil spring 102 as shown.

It is of course apparent that persons having a wide variation in weight will ride the vehicle. It has also been found that for maximum maneuverability and stability, the motorcycle frame on which the rider is seated should be permitted to lean in relation to the track assembly so that the rider may maintain his balance and maintain control of the snowmobile at high speeds by virtue of shifting the center of gravity laterally at will as circumstances dictate. It is for this reason that the bike mounting beam 71 is pivoted on pivot pins 82 and 87, the axes of these two pivot pins, when extended, constituting the lean axis 88 of the machine.

Means are provided to resiliently retain the bike frame and rider in upright position under normal circumstances, while permitting the rider to selectively control the degree of lean of the bike frame in relation to the track assembly. For this purpose, in one embodiment, a torsion bar 106 is disposed below and substantially parallel to the mounting beam 71 (FIG. 4) and is provided with an upwardly extending crank portion 107 passing through an aperture in the mounting beam 71 and anchored therein, and a downwardly depending crank portion 108 anchored in an achor plate 109 fastened to the underside of the crossbeam 29. Adjacent the union of the longitudinal portion 106 of the torsion bar with the downwardly depending crank portion 108, the torsion bar portion 106 is rotatably clamped to the underside of the mounting beam 71 by a bearing 112. It will thus be seen that when the rider leans to one side or the other (FIGS. 7-9) the center of gravity is shifted in the direction in which he leans. This has the effect of pivoting the mounting beam 71 about the lean axis 88, and such pivotal movement imposes a rotary moment of stress on the torsion bar, causing a twisting thereof. This twisting occurs because the end portion 107 functions as a crank arm to impose a rotary stress on the central long portion 106 of the torsion bar in one direction or another, while the downwardly depending portion 108 is held stationary, anchored as it is in bracket 109.

Different motorcycles have different weights, and riders will also vary in weight. It is therefore an advantage to provide a torsion bar the effective length of which may be adjusted to increase or decrease the amount of force required to lean the bike frame in relation to the track assembly. In this way the different weights encountered may be compensated by adjustment of the effective length of the torsion bar. Accordingly, referring to FIGS. 14 through 17, in another embodiment of the torsion means, there is provided a torsion bar 116 in the form of a flat generally rectangular alloy steel bar one end 117 of which is snugly seated in a socket formed in a bearing sleeve 118 welded to the flange 81. In this embodiment, lug 79 is apertured as at 119 so that the outer periphery of the bearing sleeve 118 slips snugly therethrough, the lug 79 rotating freely on the outer periphery of the cylindrical bearing member 118. Bearing sleeve 118 thus performs a double function. On the one hand it retains the torsion bar against rotation at its root and on the other hand serves as a journal for the forward end of the mounting beam 71. The opposite end of the flat torsion bar 116 extends into close proximity to the pivot pin 87, thus lying trapped insofar as longitudinal displacement is concerned. As before, the longitudinal axis of the torsion bar 116 is coincident with the extended lean axis 88 coincident with the axes of pivot pins 82 and 87.

In this embodiment of the torsion bar assembly, the effective length of the torsion bar may be selectively adjusted. Some adjustment is effected by a clamp device designated generally by the numeral 121, comprising an angle bracket 122, to one face of which is welded a bearing sleeve 123 through which the generally rectangular torsion bar 116 slidably extends as illustrated in FIG. 16. As there shown, the socket formed in the bearing sleeve 123 is rectangular to snugly yet slidably conform to the configuration of the rectangular torsion bar. The angle bracket 122 is adjustably secured to the mounting beam 71 by a clamp plate 124 and a pair of through-bolts 126 which clamp the plate 124 and bracket to the mounting beam.

Adjustment of the effective length of the torsion bar is achieved by loosening the through-bolts sufficiently to permit the bracket as a whole to be repositioned along the mounting beam so as to lengthen or shorten the effective length of the torsion bar between the bearing sockets 123 and 118. The effect of causing the mounting beam 71 to pivot in one direction or the other as illustrated in FIG. 15, is illustrated diagramatically in FIG. 17, in which it may be noted that rotation of the bearing socket 123 in the direction of the arrows to effect twisting of the flat torsion bar, brings into play the inherent resilience of the bar to exert a force tending to right the motorcycle.

To aid this function of righting the motorcycle, and to damp movement of the motorcyle frame in relation to the track assembly, the mounting beam 71 may be provided with a downwardly extending lever arm 127 as illustrated in FIG. 7, the lower end of the lever being provided with apertures 128 in a selected one of which may be anchored one end of a shock absorber 129. The other end is anchored to the stringer 24 as shown. The shock absorber may be of the fluid type, or may be of the mechanical variety. In either case, the shock absorber serves to damp pivotal movement of the motorcycle about the lean axis discussed above.

In operation of the snowmobile, it is advantageous that the tracks 42 snugly engage the associated drive sprockets. To accomplish this purpose, (FIG. 6) the shaft 47 is adjustable in relation to the longitudinal dimension of the track frame so as to draw the tracks 42 taut about the sprockets. For this purpose, a take-up bolt 131 is provided adjacent each stringer and engaged in cross-beam 38 as illustrated in FIG. 3, and adjustable to project more or less toward a lug 132 welded to sprocket mounting sleeve member 51. Sleeve member 51 may thus be positioned longitudinally along the associated stringer member 23' or 24' to vary the distance between the front and rear set of sprockets.

In the same way, it is advantageous that the lower reach of the endless track be provided with some stability and guidance over a major portion of its length. For this purpose, an elongated runner 136 is provided on opposite sides of the track frame, each runner extending parallel to the associated stringer and being resiliently mounted on the ends of cross members 31 and 32 as shown. Mounting of the runners is effected by U-shaped brackets 137 straddling the runner and attached to a short shaft 138 surrounded by a spring 139, the shaft 138 extending into and through a sleeve member 141 welded to the end of the associated cross-beam extension 34 or 36, and being provided with a retainer plate 142 at its upper end. Wheels 143 are journaled on the extreme ends of the runners, the wheels being related to the inner surface of the lower reach of the endless track and cooperating with the runners to maintain a long expanse of the lower reach of the endless track in a relatively flat attitude. The wheels also function to support the apparatus when the twin tracks are removed, providing rolling contact with a supporting floor.

In the operation of the snowmobile, it is sometimes necessary to apply brakes in order to stop the snowmobile. For this purpose, the drive housing 64 and shaft 63 journaled therewithin are provided with a brake disc 146 keyed to the shaft 63 and having a peripheral portion thereof engageable by an appropriate brake caliper 147 as shown in FIG. 5. The brake caliper is of the type that may be operated by a suitable cable, the opposite end of which is connected to a handle (not shown) to be grasped at will by the operator.

It has also been found that it is advantageous that the tracks 42 and the track frame be enclosed or covered within a shell structure as illustrated in dash lines in FIG. 5. For this purpose, the shell or fairing 151 is preferably fabricated from a fibreglass-reinforced synthetic resinous material, and is provided with an inner peripheral edge portion 152 adapted to slip snugly over the top and inside surface of the stringers 23 and 24 and to be supported thereby. Appropriate cap screws (not shown) are applied to retain the fairing in place. As illustrated best in FIG. 5, the fairing includes an outwardly extending portion superimposed over the tracks 42 so as to prevent the operator's foot from accidently being caught in the track, and to prevent the throwing of snow in the general direction of the operator of the snowmobile. Additionally, the outwardly projecting fender provides a convenient support for the riders feet as he sits astride his snowmobile.

To effectively steer the snowmobile, the steering assembly 4 includes handlebars 21 pivoted about a pivot head 18 as previously discussed, the pivot axis of the steering mechanism being along the steering axis 19. Shock absorbers 156 are provided to absorb the shock imposed by rough terrain and hard snow. The conventional fork structure 157 of the motorcycle is provided with a pair of clamps 158 secured to the forks by appropriate screws which also attach each of the clamps 158 to an intermediate clamp bracket 159 having a central opening adapted to receive a fork extender 161. The lower end of the fork extender is pivotally connected as at 162 to the upwardly extending flanges 163 formed or secured on the top surface of a ski designated generally by the numeral 164. As illustrated in FIG. 12, the ski is provided with laterally extending flange portions 166 and a bottom surface 167. The bottom surface is provided with a pair of skeds 168 as shown which have the tendency to stabilize the ski as it passes through the snow. When the ski is turned and the frame is leaned in the direction of the turn, the skeds are particularly useful because they bite into the surface of the snow and prevent skidding of the ski, thus providing for more effective steering. The skeds and mounting bracket 163 for attachment of the fork extender serve to strenghten the ski, which is preferably fabricated from a tough light fibreglass-reinforced synthetic resinous material, but which may be fabricated from other materials such as metal.

Having thus described the invention, what is claimed as new and novel and sought to be protected by letters patent is as follows:

I claim:

1. In a conversion kit for converting a conventional motorcycle having a frame, a power unit and a steering assembly including a fork structure pivotal about a steering axis, into a snowmobile,
   a. a track assembly including a track frame, sprocket means mounted on opposite ends of said track frame and associated with opposite sides thereof, and endless track means rotatably supported on said sprocket means and operable to propel the track assembly over snow;
   b. a drive assembly mounted on said track frame and operatively connected to said endless track means to selectively effect rotation thereof when said drive assembly is driven;
   c. a mounting beam pivotally mounted on said track frame for detachably receiving thereon a conventional motorcycle frame and power unit and adapted to normally support said motorcycle frame and power unit in a perpendicular attitude with respect to the track frame;
   d. primary drive means including a portion mounted on said mounting beam and pivotal therewith and adapted for interconnection between the drive assembly and the power unit of said motorcycle to effect driving of said drive assembly and selective rotation of said endless tracks; and
   e. ski means adapted to be mounted on the fork structure of the motorcycle and positioned ahead of said track frame for engagement with the snow to effect steering while in operation.

2. The combination according to claim 1, in which said track frame includes track guide means including elongated runners having wheels on opposite ends thereof rollably engaging the endless track means adjacent said sprocket means, said track guide means being resiliently mounted on the track frame in operative association with each endless track means to retain a major portion of the lower reach of the track means straight and flat for a major portion of its length between said sprocket means mounted on opposite ends of said track frame.

3. The combination according to claim 1, in which said primary drive means includes a universal joint one portion of which maintains a constant attitude in relation to the track assembly, while the other portion thereof maintains a constant attitude in relation to the motorcycle mounting beam, whereby in all attitudes of said motorcycle mounting beam, motive power is deliverable to said endless track means to propel the snowmobile over the snow.

4. The combination according to claim 1, in which torsion means are provided interposed between said motorcycle mounting beam and said track frame.

5. The combination according to claim 1, in which said motorcycle mounting beam is pivoted at its forward end below and adjacent the forward end of the track frame and pivoted at its aft end above and adjacent the aft end of the track frame.

6. The combination according to claim 1, in which said ski means includes two sets of brackets detachably secured on said fork structure, a fork extender post detachably secured to said fork structure by said brackets, and a ski pivotally mounted on the lower end of said fork extender post and adapted to engage the snow in front of said track frame.

7. The combination according to claim 1, in which said drive assembly includes a main drive shaft journaled for rotation on said track frame, a driven sprocket on said main drive shaft, an auxiliary drive shaft mounted on said track frame parallel to said main drive shaft and having a sprocket keyed thereto and connected by a chain to said driven sprocket on the main drive shaft, a stub shaft rotatably supported on said mounting beam and normally axially aligned with said auxiliary drive shaft but pivotable with said mounting beam to effect disalignment therebetween, a universal joint operatively interposed between said auxiliary drive shaft and said stub shaft to lock the two shafts for rotation together despite said disalignment, a sprocket on said stub shaft to effect rotation thereof, and means interconnecting said last mentioned sprocket to said power unit to drive said drive assembly.

8. The combination according to claim 1, in which brake means are associated with said drive assembly operable to stop rotation of said endless track means.

9. The combination according to claim 1, in which said track frame comprises a rigid generally rectangular framework fabricated from spaced from spaced and parallel longitudinally extending tubular steel stringers having welded thereacross at intervals a plurality of tubular steel cross-beams, said sprocket means being journaled in relation to said frame so that the upper reaches of said endless tracks always lie in substantial planar alignment with the upper surface of said frame while the lower reaches of said endless tracks always depend below said frame, and means disposed between the lower reaches of said tracks and said frame to retain the lower reaches always spaced below said frame.

10. The combination according to claim 1, in which said sprocket means includes one set thereof mounted on said track frame for pivotal movement in relation thereto, while a remaining set thereof at the other end of the track frame are restrained from pivotal movement in relation to the track frame, the pivotally mounted sprocket means being associated with the forward end of the track frame and functioning to absorb impact shocks delivered to the forward end of the track frame during use.

11. The combination according to claim 10, in which the pivot point of said set of sprockets which are pivotally mounted on the track frame is selectively adjustable longitudinally of the track frame to effect adjustment of the tension of said endless track means.

12. In a conversion kit for converting a conventional motorcycle having a frame, a power unit and a steering assembly including a fork structure pivotal about a steering axis, into a snowmobile,
 a. a track assembly including a track frame, sprocket means mounted on opposite ends of said track frame and associated with opposite sides thereof, and endless track means rotatably supported on said sprocket means and operable to propel the track assembly over snow;
 b. a drive assembly mounted on said track frame and operatively connected to said endless track means to selectively effect rotation thereof when said drive assembly is driven;
 c. a mounting beam pivotally mounted on said track frame for receiving thereon a motorcycle frame and adapted to normally support said motorcycle frame in a perpendicular attitude with respect to the track frame;
 d. primary drive means adapted for interconnection between the drive assembly and the power unit of said motorcycle to effect driving of said drive assembly and selective rotation of said endless tracks;
 e. ski means adapted to be mounted on the fork structure of the motorcycle and positioned ahead of said track frame for engagement with the snow to effect steering while in operation; and
 f. a torsion bar assembly operatively interposed between said pivoted motorcycle mounting beam and said track frame and including bracket means selectively adjustable to vary the effective length of the torsion bar to vary the amount of force required to pivot the motorcycle mounting beam in relation to the track frame.

13. In a conversion kit for converting a conventional motorcycle having a frame, a power unit and a steering assembly including a fork structure pivotal about a steering axis, into a snowmobile,
 a. a track assembly including a track frame, sprocket means mounted on opposite ends of said track frame and associated with opposite sides thereof, and endless track means rotatably supported on said sprocket means and operable to propel the track assembly over snow;
 b. a drive assembly mounted on said track frame and operatively connected to said endless track means to selectively effect rotation thereof when said drive assembly is driven;
 c. a mounting beam pivotally mounted on said track frame for receiving thereon a motorcycle frame and adapted to normally support said motorcycle frame in a perpendicular attitude with respect to the track frame;
 d. primary drive means adapted for interconnection between the drive assembly and the power unit of said motorcycle to effect driving of said drive assembly and selective rotation of said endless tracks;
 e. ski means adapted to be mounted on the fork structure of the motorcycle and positioned ahead of said track frame for engagement with the snow to effect steering while in operation; and
 f. said motorcycle mounting beam being pivoted to said track frame along an axis which is inclined to the surface on which the snowmobile is operating.

14. The combination according to claim 13, in which said axis about which the mounting beam is pivotable, when extended, intercepts the surface on which the snowmobile is operating at a point ahead of said track frame.

15. The combination according to claim 13, in which said axis about which the mounting beam is pivotable, when extended, intercepts said steering axis when extended at substantially said point of interception of the steering axis by the surface on which said ski is operating.

16. In a conversion kit for converting a conventional motorcycle having a frame, a power unit and a steering assembly including a fork structure pivotal about a steering axis, into a snowmobile,
   a. a track assembly including a track frame, sprocket means mounted on opposite ends of said track frame and associated with opposite sides thereof, and endless track means rotatably supported on said sprocket means and operable to propel the track assembly over snow;
   b. a drive assembly mounted on said track frame and operatively connected to said endless track means to selectively effect rotation thereof when said drive assembly is driven;
   c. a mounting beam pivotally mounted on said track frame for receiving thereon a motorcycle frame and adapted to normally support said motorcycle frame in perpendicular attitude with respect to the track frame;
   d. primary drive means adapted for interconnection between the drive assembly and the power unit of said motorcycle to effect driving of said drive assembly and selective rotation of said endless tracks;
   e. ski means adapted to be mounted on the fork structure of the motorcycle and positioned ahead of said track frame for engagement with the snow to effect steering while in operation;
   f. said motorcycle mounting beam being pivoted at its forward end below and adjacent the forward end of the track frame and pivoted at its aft end above and adjacent the aft end of the track frame; and
   g. torsion means having a longitudinal axis coincident with an axis extending through the fore and aft pivot points of said mounting beam, one end of said torsion means being secured to said track frame and an intermediate portion of said torsion means being secured to said mounting beam.

* * * * *